(12) United States Patent
Hirano et al.

(10) Patent No.: US 8,539,554 B2
(45) Date of Patent: Sep. 17, 2013

(54) MOBILE NETWORK MANAGING APPARATUS AND MOBILE INFORMATION MANAGING APPARATUS FOR CONTROLLING ACCESS REQUESTS

(75) Inventors: Jun Hirano, Kanagawa (JP); Keigo Aso, Kanagawa (JP); Chun Keong Benjamin Lim, Singapore (SG); Chan Wah Ng, Singapore (SG); Tien Ming Benjamin Koh, Singapore (SG); Pek Yew Tan, Singapore (SG)

(73) Assignee: Panasonic Corporation, Osaka (JP)

( * ) Notice: Subject to any disclaimer, the term of this patent is extended or adjusted under 35 U.S.C. 154(b) by 1093 days.

(21) Appl. No.: 12/158,968

(22) PCT Filed: Dec. 26, 2006

(86) PCT No.: PCT/JP2006/326359
§ 371 (c)(1),
(2), (4) Date: Jun. 23, 2008

(87) PCT Pub. No.: WO2007/077958
PCT Pub. Date: Jul. 12, 2007

(65) Prior Publication Data
US 2009/0313680 A1    Dec. 17, 2009

(30) Foreign Application Priority Data
Dec. 26, 2005 (JP) .................................. 2005-373126

(51) Int. Cl.
*G06F 7/04* (2006.01)
(52) U.S. Cl.
USPC ............................................................ 726/4
(58) Field of Classification Search
USPC ............................................. 726/2, 3, 4, 6, 7
See application file for complete search history.

(56) References Cited

U.S. PATENT DOCUMENTS

| 6,978,128 | B1 * | 12/2005 | Raman et al. | ............... 455/414.1 |
| 7,990,935 | B2 * | 8/2011 | Oyama et al. | ................. 370/338 |

(Continued)

FOREIGN PATENT DOCUMENTS

| EP | 1 209 928 | 5/2002 |
| WO | 2005/094037 | 10/2005 |
| WO | WO2005094037 | * 10/2005 |

OTHER PUBLICATIONS

Ng Panasonic Singapore Labs T Tanaka Matsushita Communications Industrial C W, "Usage Scenario and Requirements for AAA in Network Mobility Support" IETF Standard—Working-Draft, Internet Engineering Task Force, IETF, CH, Oct. 2002, XP015004581 1SSN: 0000-0004.*

(Continued)

*Primary Examiner* — Michael S McNally
*Assistant Examiner* — Daniel Hoang
(74) *Attorney, Agent, or Firm* — Dickinson Wright PLLC (57) ABSTRACT

Disclosed is a technique capable of proper execution of access control based on various security policies set by a home user with regards to a packet sent from a visitor node. According to the technique, a MR (Mobile Router) 10 which manages a mobile PAN 30 determines whether a sender of a packet from a communication terminal connected to the mobile PAN is a home user's node which is allowed direct access into a home network or a visitor node (VN 31), and forwards the packet from the home user's node to an HA 20 while forwarding the packet from the visitor node to a policy server 36 located in a DMZ 35. This allows the policy server to perform access control on every packet from a visitor node which attempts to gain access into the home network based on a security policy 36*a*.

12 Claims, 8 Drawing Sheets

(56) References Cited

U.S. PATENT DOCUMENTS

2003/0101200 A1* 5/2003 Koyama et al. .............. 707/200
2004/0120295 A1   6/2004 Liu

OTHER PUBLICATIONS

Kwon S Baek S Pack Y Choi Seoul National University T: "AAA for NEMO" IETF Standard-Working-Draft, Internet Engineering Task Force, IETF, CH, It Jul. 2005 (Jul. 11, 2005), XP015040493 1SSN: 0000-0004 2.*

European Search Report dated Dec. 7, 2009.

International Search Report dated Apr. 19, 2007.

Yoshihiro Ohba, et al., "Problem Statement and Usage Scenarios for PANA," IETF Standard—Working—Draft, Internet Engineering Task Force, IETF, CH, vol. pana, No. 4, Feb. 20, 2003, XP015024843 ISSN: 0000-0004 chapter 1., 2. and 3.5.

S. Kwon et al., "AAA for NEMO," IETF Standard-Working-Draft, Internet Engineering Task Force, IETF, CH, Jul. 11, 2005, XP015040493 ISSN: 0000-0004 the whole document.

C. Ng et al., "Usage Scenario and Requirements for AAA in Network Mobility Support," IETF Standard-Working-Draft, Internet Engineering Task Force, IETF, CH, Oct. 2002, XP015004581, ISSN:0000-0004 the whole document.

D. Johnson, et al., "Mobility Support in IPv6," Network Working Group, RFC: 3775, Jun. 2004, pp. 1-165.

V. Devarapalli, et al., "Network Mobility (NEMO) Basic support Protocol," Network Working Group, RFC: 3963, Jan. 2005, pp. 1-33.

D. Newman, "Benchmarking Terminology for Firewall Performance," Network Working Group, RFC: 2647, Aug. 1999, pp. 1-26.

* cited by examiner

MOBILE NETWORK MANAGING APPARATUS AND MOBILE INFORMATION MANAGING APPARATUS FOR CONTROLLING ACCESS REQUESTS

TECHNICAL FIELD

The present invention relates to a mobile network managing apparatus and a mobile information managing apparatus which execute communication using a mobile communication network, and, particularly, to a mobile network managing apparatus and a mobile information managing apparatus which execute access control to improve the securities of a personal mobile communication network and a home network.

BACKGROUND ART

The concept of network mobility allows users to be contacted even when they are away from their homes (out of homes).

A typical technique to allow such an action to be achieved is one using mobile IP as defined in "Mobility Support in IPv6", Internet Engineering Task Force Request For Comments 3775, June in 2004 (hereinafter "Non-patent Document 1").

With the use of the mobile IP technique, even when a user unplugs a mobile device from its communication cable connection, the connectivity is transferred from the user's home DSL line (cable connection) over to a cellular access system (wireless connection). The switching from the cable connection to the wireless connection can permit the user to continue downloading a file or conducting a voice over IP (VoIP) conversation.

Accordingly, a user can move around with a mobile device, and can keep seamless network connectivity even when the user is out of home by switching to a wireless connection point.

Further, the user is able to form a mobile personal area network (PAN) and maintain seamless network connectivity while traveling around. A typical technique that achieves such a PAN like network mobility would be a network mobility (NEMO) as defined in "Network Mobility (NEMO) Basic Support Protocol", Internet Engineering Task Force Request For Comments 3963, January in 2005 (hereinafter "Non-patent Document 2").

Nodes within the mobile PAN are able to communicate with other global nodes by routing their intended data traffic through mobile routers (MR) that are located within the mobile PAN.

The MR registers its current location address, also known as Care-of-Address (CoA) with a home agent (HA; mobile information managing apparatus). The home agent (HA) functions as a router within the user's home network and intercepts packets destined for the home address of the mobile node, encapsulates the packets, and tunnels the encapsulated packets to the registered CoA of the mobile node.

In NEMO, while the MR is on a foreign link, a bi-directional tunnel is established between the MR and the HA to permit packets to be sent to each other via the bi-directional tunnel. As described in Non-patent Document 2, every traffic originating from and terminating at the mobile PAN is sent via the bi-directional tunnel.

A user may authorize foreign nodes to operate within the user's mobile PAN. Hereinafter, this foreign node may be called "visitor node (VN)".

A VN may be authorized by the user to access data located within the user's home network (for example, music files present in the user's home media server). In this case, various security policies to which the VN must conform to should be configured before the VN is allowed to access the user's home network.

A policy server (security managing apparatus) located within the DMZ (De-Militarized Zone), which is situated between the user's home network and a foreign network, can implement such security policies for the VNs, as defined in "Benchmarking Terminology for Firewall Performance", Internet Engineering Task Force Request For Comments 2647, August in 1999 (hereinafter "Non-patent Document 3"). The DMZ is situated between the user's home domain and the global Internet.

US Patent Application Publication No. 2004-0120295 (hereinafter "Patent Document 1") proposes a method of allowing a correspondent node (CN) located within the home network to establish a secure communication channel with a mobile node (MN) that is attached on a foreign link.

A mobile IP proxy along with a VPN (Virtual Private Network) server located within the DMZ will allow the MN and the CN to establish a secure tunnel therebetween.

According to the technique disclosed in Non-patent Document 3, however, as every traffic within the mobile PAN is tunneled between the MR and HA, a VN's packet will therefore bypass the policy server within the DMZ and thus the various security policies that have been set by the user will not be implemented.

In the technique disclosed in Patent Document 1, however, the mobile IP proxy acts as a surrogate HA to the MN and a surrogate MN to the HA. This would mean that the mobile IP proxy would need to have knowledge of security association keys of both the MN and HA. The technique of Patent Document 1 has not taken into account, access control of the VN connected under the control of the MR located in a foreign network.

DISCLOSURE OF THE INVENTION

In consideration of the foregoing problems, it is an object of the present invention to provide a mobile network managing apparatus and a mobile information managing apparatus capable of surely executing access control based on various security policies set by a home user with regard to packets sent from a visitor node (VN).

To achieve the object, according to the present invention, there is provided a mobile network managing apparatus for controlling and moving with a mobile network, comprising:

an access request reception means that receives an access request to a home network of the mobile network managing apparatus from a communication terminal connected to the mobile network;

determination means that determines whether the communication terminal having sent the access request received by the access request reception means is allowed to perform direct access into the home network or not;

home network communication means that forwards the access request to a mobile information managing apparatus present in the home network when the communication terminal having sent the access request is allowed to perform direct access into the home network; and security network communication means that forwards the access request to a security managing apparatus which is located in a security network located between the home network and a foreign network and executes access control for the home network, when the communication terminal having sent the access request is not allowed to perform direct access into the home network.

With the above structure, a visitor node (VN) connected to a mobile network can be identified, and the security managing apparatus (policy server) can perform access control to govern the rights of the visitor node to gain access to the home network.

Further, in addition to the structure, the mobile network managing apparatus of the invention is configured to include:

communication terminal specifying means that specifies whether the communication terminal is allowed to perform direct access into the home network at a time the communication terminal is connected to the mobile network; and information storage means that stores information indicating whether the communication terminal is allowed to perform direct access into the home network or not, wherein referring to the information stored in the information storage means, the determination means determines whether the communication terminal having sent the access request is allowed to perform direct accessed into the home network or not.

This structure can store information indicating if the node is a visitor node at the point of time in which the node is connected to a mobile network, and identify whether or not a communication terminal which has made an access request is a visitor node by using the information.

Further, in addition to the structure, the mobile network managing apparatus of the invention includes:

prefix notifying means that notifies prefixes of different addresses respectively to a communication terminal which is allowed to perform direct access into the home network and a communication terminal which is not allowed to perform direct access into the home network, wherein referring to the prefix of the address of a sender of the access request, the determination means determines whether the communication terminal having sent the access request is allowed to perform direct access into the home network or not.

This structure allows the prefix of an address to be assigned to a visitor node different from that of the home user's node, making it possible to identify whether or not a communication terminal which has made an access request is a visitor node by referring to the prefix of the address of the sender having made an access request.

Further, in addition to the structure, the mobile network managing apparatus of the invention includes:

first tunneling means that forms a tunnel with the mobile information managing apparatus, and encapsulates the access request when the home network communication means forwards the access request; and second tunneling means that forms a tunnel with the security managing apparatus, and encapsulates the access request when the security network communication means forwards the access request.

This structure allows the mobile network managing apparatus (mobile router) to forward an access request received from a communication terminal under the control of the mobile network managing apparatus (mobile router) to the mobile information managing apparatus (home agent) or the security managing apparatus (policy server) in a secure state without changing the access request.

To achieve the object, according to the invention, there is provided a mobile network managing apparatus for controlling and moving with the mobile network, comprising:

an access request reception means that receives an access request to a home network of the mobile network managing apparatus from a communication terminal connected to the mobile network;

determination means that determines whether the communication terminal having sent the access request received by the access request reception means is allowed to perform direct access into the home network or not;

information adding means that adds, to the access request, index information indicating whether the communication terminal having sent the access request is allowed to perform direct access into the home network or not; and home network communication means that forwards the access request having the index information added thereto by the information adding means to a mobile information managing apparatus present in the home network.

This structure makes it possible to identify a visitor node (VN) connected to a mobile network by means of adding index information to an access request to the home network from the visitor node. The presence of the index information indicates that the access request is made from a visitor node.

Further, in addition to the structure, the mobile network managing apparatus of the invention includes:

communication terminal specifying means that specifies whether the communication terminal is allowed to perform direct access into the home network at a time the communication terminal is connected to the mobile network; and information storage means that stores information indicating whether the communication terminal is allowed to perform direct access into the home network or not, wherein referring to the information stored in the information storage means, the determination means determines whether the communication terminal having sent the access request is allowed to perform direct access into the home network or not.

This structure can store information indicating that the node is a visitor node at the point of time in which the node is connected to a mobile network. The information also allows a means to identify whether or not a communication terminal which has made an access request is a visitor node.

Further, in addition to the structure, the mobile network managing apparatus of the invention includes:

prefix notifying means that notifies prefixes of different addresses respectively to a communication terminal which is allowed to perform direct access into the home network and a communication terminal which is not allowed to perform direct access into the home network, wherein referring to the prefix of the address of a sender of the access request, the determination means determines whether the communication terminal having sent the access request is allowed to perform direct access into the home network or not.

This structure allows a visitor node and a home user's node to make use of a different address prefix for communication means in the home network. Thus, this makes it possible to identify whether or not a communication terminal which has made an access request is a visitor node by referring to the prefix used in the address.

Further, in addition to the structure, the mobile network managing apparatus of the invention includes:

tunneling means that forms a tunnel with the mobile information managing apparatus, and encapsulates the access request when the home network communication means forwards the access request.

This structure can allow the mobile network managing apparatus (mobile router) to forward an access request received from a communication terminal under the control of the mobile network managing apparatus (mobile router) to the mobile information managing apparatus (home agent) in a secure state without changing the access request.

To achieve the object, according to the invention, there is provided a mobile information managing apparatus that performs mobile management of a communication terminal attempting to directly access a home network, comprising:

packet reception means that receives an encapsulated packet from a mobile network managing apparatus, which is controlling and moving with a mobile network;

decapsulating means that decapsulates the encapsulated packet;

determination means that determines whether the communication terminal having sent the access request is allowed to perform direct access into the home network or not by referring to a prefix of a sender address in an internal packet decapsulated when the internal packet is an access request for the home network;

home network communication means that forwards the access request to a destination designated by a destination address of the internal packet when the communication terminal having sent the access request is allowed to perform direct access into the home network; and security network communication means that forwards the access request to a security managing apparatus which is located in a security network located between the home network and a foreign network and executes access control for the home network, when the communication terminal having sent the access request is not allowed to perform direct access into the home network.

With this structure, in a case where the prefixes of addresses are assigned so as to distinguish a communication terminal which is allowed to perform direct access into the home network from a communication terminal which is not allowed to perform direct access into the home network, the mobile information managing apparatus (home agent) can identify whether or not a communication terminal which has made an access request is a visitor node by referring to the prefix of the address of the sender having made an access request.

To achieve the object, according to the invention, there is provided a mobile information managing apparatus that performs mobile management of a communication terminal attempting to access directly a home network, comprising:

packet reception means that receives an encapsulated packet from a mobile network managing apparatus, which is controlling and moving with the mobile network;

decapsulating means that decapsulates the encapsulated packet and acquires index information added to an encapsulated header and indicating whether a sender of the decapsulated internal packet is allowed to perform direct access into the home network or not;

determination means that determines whether the communication terminal having sent the access request is allowed to perform direct access into the home network or not by referring to the index information when the decapsulated internal packet is an access request for the home network;

home network communication means that forwards the access request to a destination designated by a destination address of the internal packet when the communication terminal having sent the access request is allowed to perform direct access into the home network; and security network communication means that forwards the access request to a security managing apparatus which is located in a security network located between the home network and a foreign network and executes access control for the home network, when the communication terminal having sent the access request is not allowed to perform direct access into the home network.

With this structure, in a case where the index information added to an access request is used to distinguish whether a communication terminal is allowed or not to perform direct access into the home network, the mobile information managing apparatus (home agent) can identify whether or not a communication terminal which has made an access request is a visitor node by referring to the index information.

Further, in addition to the structure, the mobile information managing apparatus of the invention includes:

tunneling means that forms a tunnel with the security managing apparatus, and encapsulates the access request when the security network communication means forwards the access request.

This structure can allow the mobile network managing apparatus (mobile router) to forward an access request received from a communication terminal under control to the security managing apparatus (policy server) in a secure state without changing the access request.

The invention with the above-described structure has an advantage such that it is possible to ensure proper execution of access control based on various security policies set by a home user with regards to packets sent from a visitor node (VN).

BEST MODE FOR CARRYING OUT THE INVENTION

Figure 1:
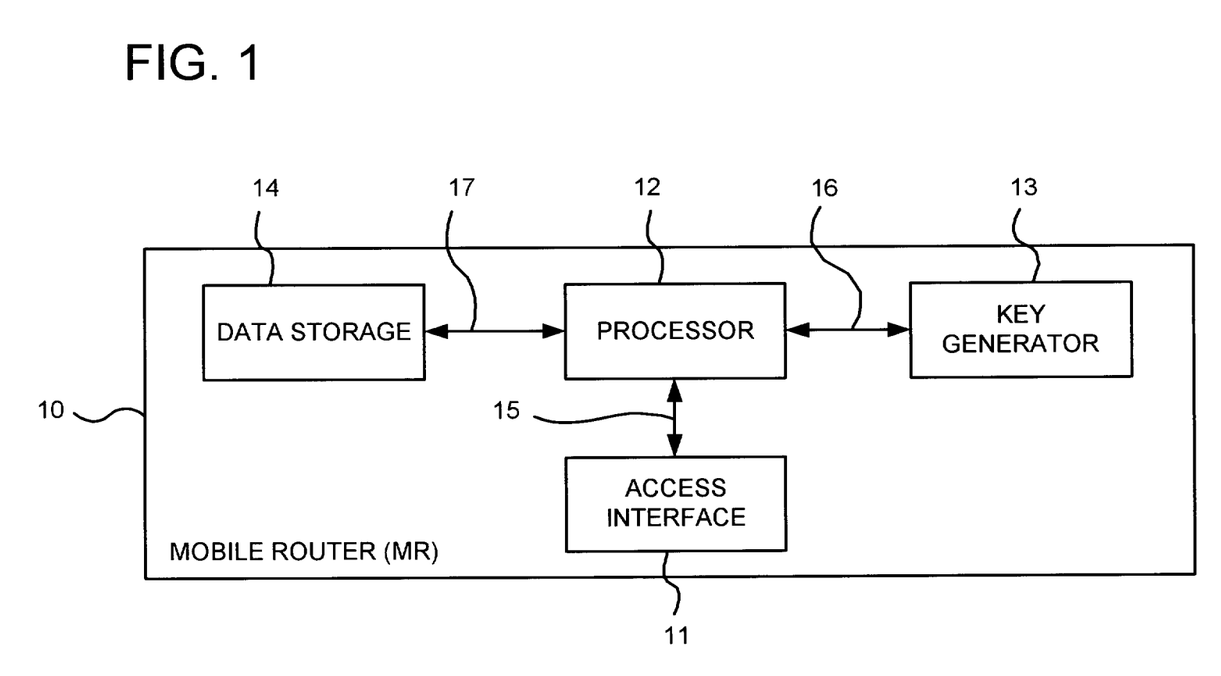
FIG. 1 is a diagram illustrating a preferable example of the configuration of a mobile router (MR) according to a preferred embodiment of the invention.

Preferred embodiments of the present invention will be described below with reference to the accompanying drawings. To begin with, the configuration of a mobile router according to one embodiment of the invention will be explained. FIG. 1 is a diagram illustrating a preferable example of the configuration of a mobile router (MR) according to one embodiment of the invention.

A MR 10 shown in FIG. 1 comprises of an access interface 11, which allows the MR 10 to transmit packets to other nodes and receive packets therefrom. The access interface 11 may be Wi-Fi (Wireless Fidelity), Bluetooth (registered trademark) or Cellular (cell phone) as an example, but is not restricted to those interfaces. The access interface 11 sends and receives packets to and from a processor 12 via a path 15.

The MR 10 further includes the processor 12, which processes incoming and outgoing packets. The processor 12 executes a process of forming bi-directional tunnels and a process of generating binding updates for the MR 10. In addition, the processor 12 executes a process on binding acknowledgements received from its home agent and a process of updating a binding update list stored in a data storage 14.

When security keys are required, the processor 12 sends a signal via a path 16 to a key generator 13 located within the MR 10. When the key generator 13 receives the signal, the key generator 13 generates keys needed for the processor 12 and sends the keys to the processor 12 via the path 16.

Also, the MR 10 includes the data storage 14, which stores information required by the MR 10. The data storage 14 is connected via a path 17 to the processor 12, which stores and reads information into and from the data storage 14. Information stored in the data storage 14 may be the prefix of a home address (which hereinafter may also be called home address prefix), a binding update list or the prefix of a mobile network, as one example, but is not limited to those information.

Figure 2:
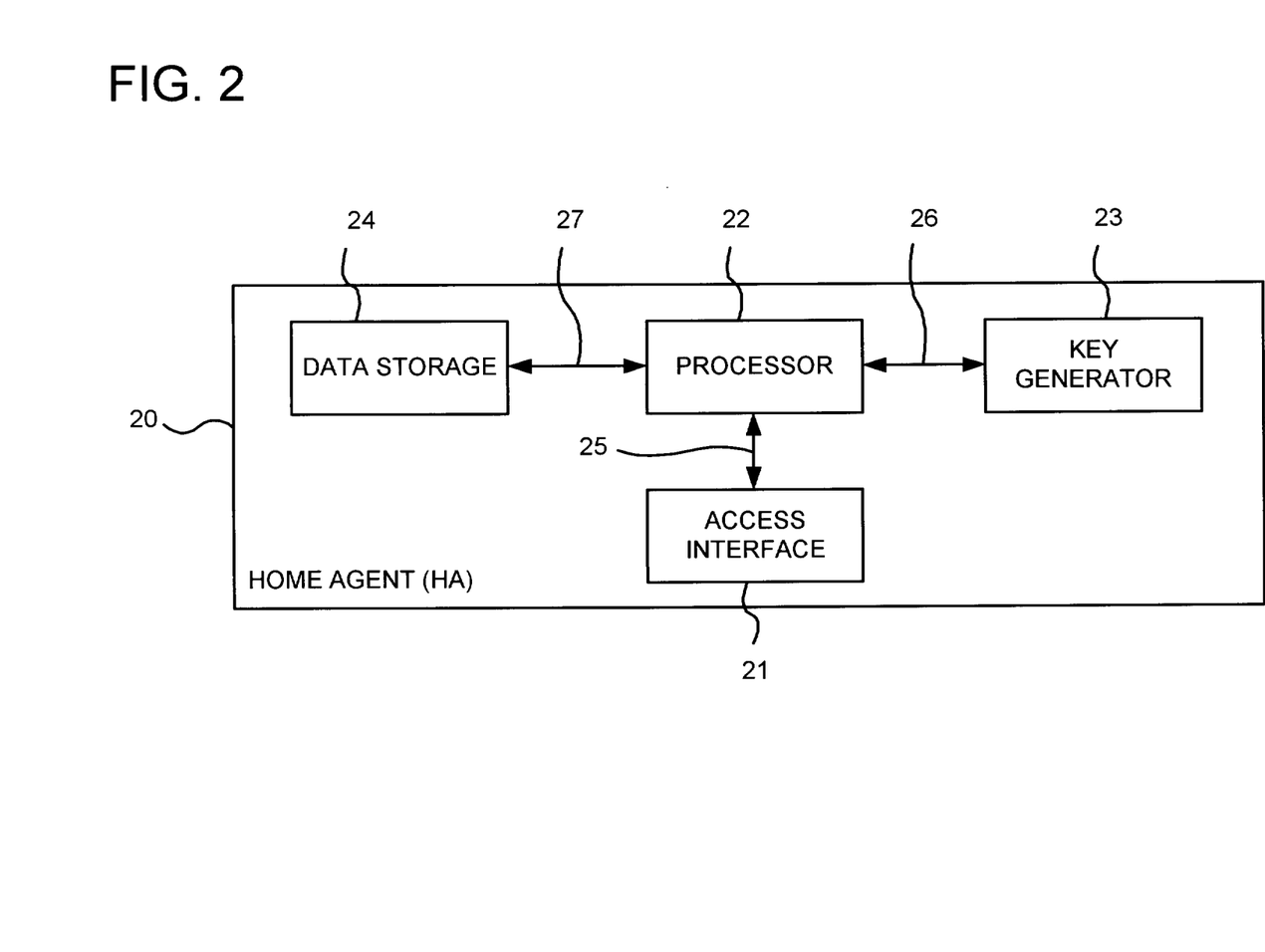
FIG. 2 is a diagram illustrating a preferable example of the configuration of a home agent (HA) according to a preferred embodiment of the invention.

FIG. 2 is a diagram illustrating a preferable example of the configuration of the home agent (HA) of the preferred embodiment of the invention.

The HA 20 shown in FIG. 2 includes an access interface 21, which allows the HA 20 to transmit packets to other nodes or receive packets therefrom. The access interface 21 may be Ethernet (registered trademark), Wi-Fi or Cellular (cell phone), but is not restricted to those interfaces. The access interface 21 sends and receives packets to and from a processor 22 via a path 25.

The processor 22 located within the HA 20 has functions such as processing of incoming and outgoing packets from the path 25 and forming of bi-directional tunnels. The HA 20 further has the functions of processing binding update messages sent from the MR 10, updating a binding update cache stored in the data storage 14 via a path 27 and sending binding acknowledgements to the MR 10.

The HA 20 further has a key generator 23 which, upon reception of a signal from the processor 22 via a path 26, generates necessary keys and sends the keys to the processor 22 via the path 26.

The HA 20 further has a data storage 24, which stores information required by the HA 20. Information stored in the data storage 24 may be a home address prefix, a binding update cache or a mobile network prefix, as an example, but is not restricted to those information.

Figure 3:
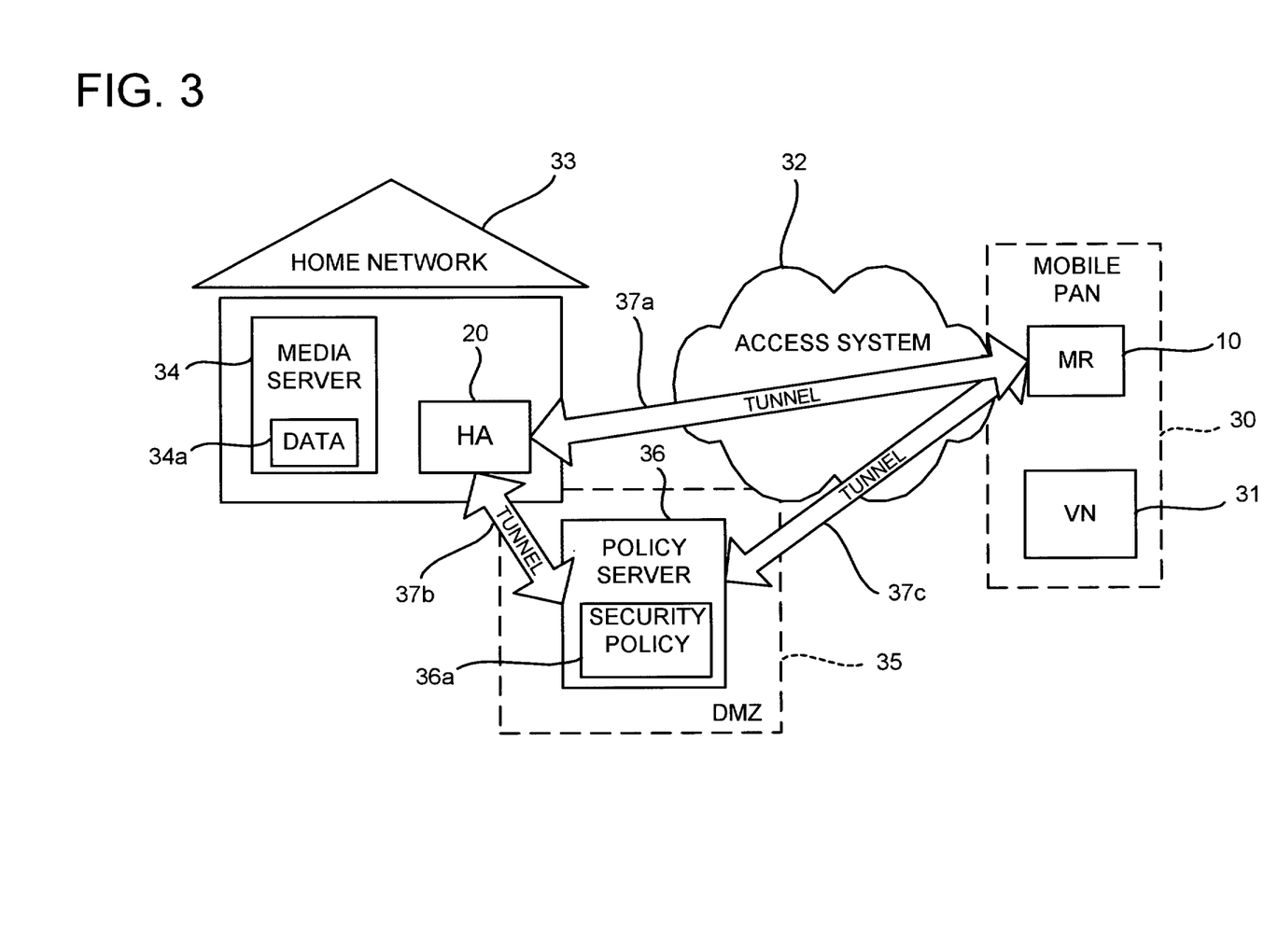
FIG. 3 is a diagram illustrating a communication system according to a preferred embodiment of the invention.

Next, the outline of a communication system according to the preferred embodiment of the invention will be explained. FIG. 3 is a diagram illustrating one example of the communication system according to the preferred embodiment of the invention. In the communication system shown in FIG. 3, a mobile personal area network (PAN) 30 includes a visitor node (VN) 31, which functions as a foreign node within the mobile PAN 30. The VN 31 may be a mobile node or a fix node.

The mobile PAN 30 further includes a mobile router (MR) 10, which routes all traffic within the mobile PAN 30. When the MR 10 is performing path optimization with a Correspondent Node (CN) (which is not illustrated in this system), the MR 10 may directly send packets to the CN, but will route all traffic within the mobile PAN 30 to the home agent (HA) 20 in this embodiment.

The VN 31 is connected to the mobile router (MR) 10 and would be authorized to function within the mobile PAN 30.

The MR 10 and the HA 20 establish a bi-directional tunnel 37a through an access system 32 to allow traffic to be routed therebetween. The access system 32 may be but not restricted to the Internet, a cellular network, etc.

The MR 10 and the policy server 36 establish another bi-directional tunnel 37c through the access system 32 for routing traffic between each other. The bi-directional tunnel 37c is needed, for example, in a mode where the MR 10 forwards packets to the policy server 36, as will be described later, but need not be established in a mode where the MR 10 forwards packets only to the HA 20.

A home network 33 includes an HA 20, which forwards all packets destined for the MR 10 thereto, thereby allowing the MR 10 to remain reachable even when it is not within the home network 33.

The HA 20 maintains an update of the current Care-of-Address (CoA) and establishes the bi-directional tunnel 37a to the MR 10 for routing traffic. In addition, the HA 20 communicates with the policy server 36 for routing traffic to each other. Furthermore, the HA 20 may establish a bi-directional tunnel 37b with the policy server 36.

The home network 33 further includes a media server 34. The media server 34 contains data 34a of the home user to which the VN 31 wishes to gains access. The data 34a may be audio files or video files or the like, but not restricted to those file types.

To improve the security level of the home network 33, a DMZ (De-Militarized Zone) 35 is provided for the home network 33. The DMZ 35 includes the policy server 36, which contains security policies 36a that would be effected upon reception of data packets from the VN 31.

The policy server 36 may be one or a plurality of servers located within the DMZ 35, but is not restricted to this structure. The policy server 36 may have the function of the firewall gateway. The security policy 36a has the format of Extended Markup Language (XML), but is not restricted thereto. Furthermore, the security policies 36a may be user implemented policies, but are not restricted thereto.

When the MR 10 is within the home network 33, the MR 10 performs an operation of obtaining one home address prefix or multiple home address prefixes from the HA 20 to determine the home address of the MR 10. In this case, once the MR 10 obtains the prefix the home address, the MR 10 uses stateless address auto-configuration to configure a unique home address and registers the unique home address with the HA 20. The home address of the MR 10 can be set by an arbitrary method, such as manual presetting.

Once the MR 10 has successfully configured its home address, the MR 10 is able to broadcast one home address prefix or multiple home address prefixes obtained from the HA 20 within the mobile PAN 30. Nodes connected to the MR 10 then can use the broadcast prefix(es) to configure their unique home addresses. The nodes that are connected to the MR 10 may be visitor nodes (VN) 31 or home user nodes, but are not restricted thereto. As will be discussed later, at this time, the MR 10 can allocate different prefixes to a home user node, a local fixed node (LFN) fixed within the mobile PAN 30 and the VN 31 which is targeted for access control.

When the MR 10 leaves the home network 33 and is connected to a foreign link, the MR 10 acquires a care-of-address (CoA) from the connected AR (Access Router).

Once the MR 10 has successfully obtained the CoA, the MR 10 attempts to establish a bi-directional tunnel with the HA 20 by performing a security association therewith. The method of establishing a security association between the MR 10 and the HA 20 may be but not restricted to internet key exchange (IKE).

Once the security association between the MR 10 and the HA 20 has been established, the MR 10 will then perform a process of sending a binding update (BU) message to the HA 20 to update the address at the current point.

The HA 20 checks if the BU message is from a valid home user before updating its BU cache. Then, the HA 20 will associate the unique home address of the MR 10 with the current CoA of the MR 10.

Figure 4A:
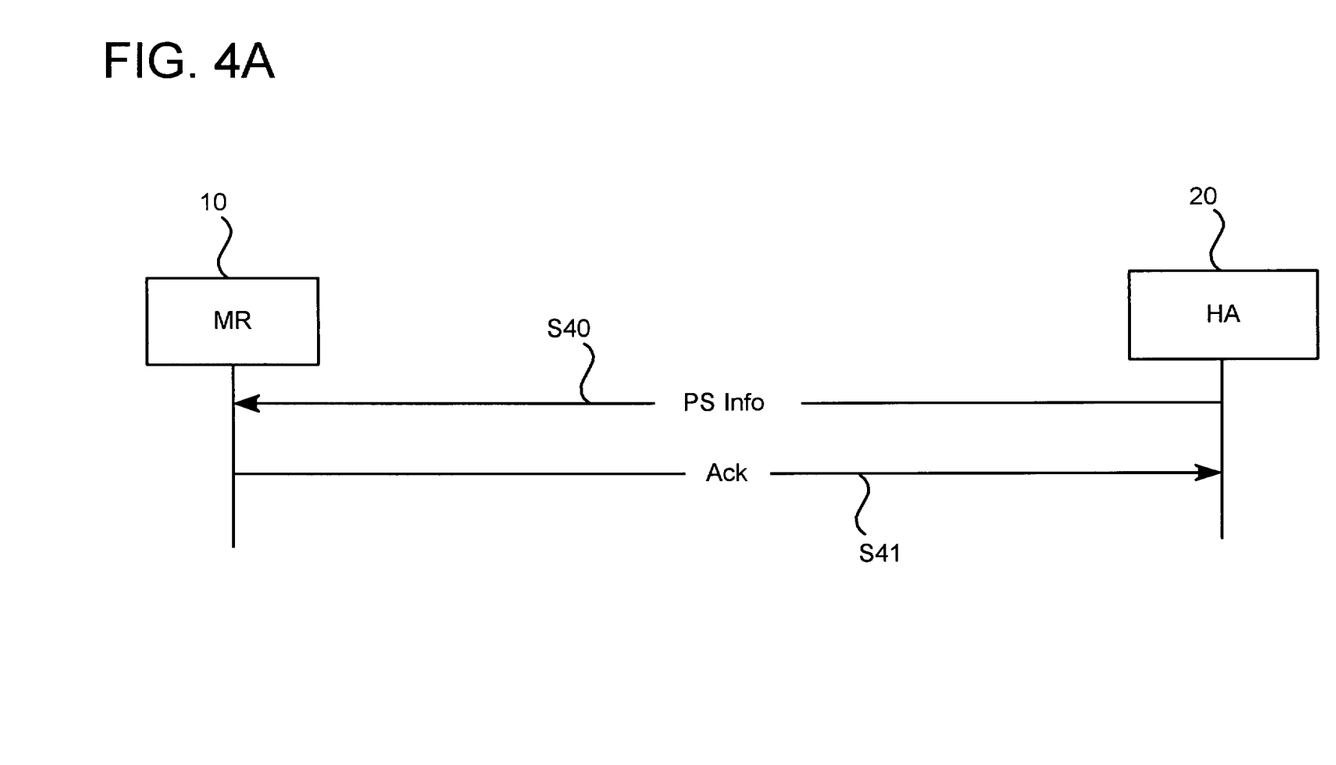
FIG. 4A is a sequence chart illustrating one example of how the home agent (HA) informs the mobile router (MR) of information on a policy server within a de-militarized zone (DMZ) according to a preferred embodiment of the invention.
Figure 4B:
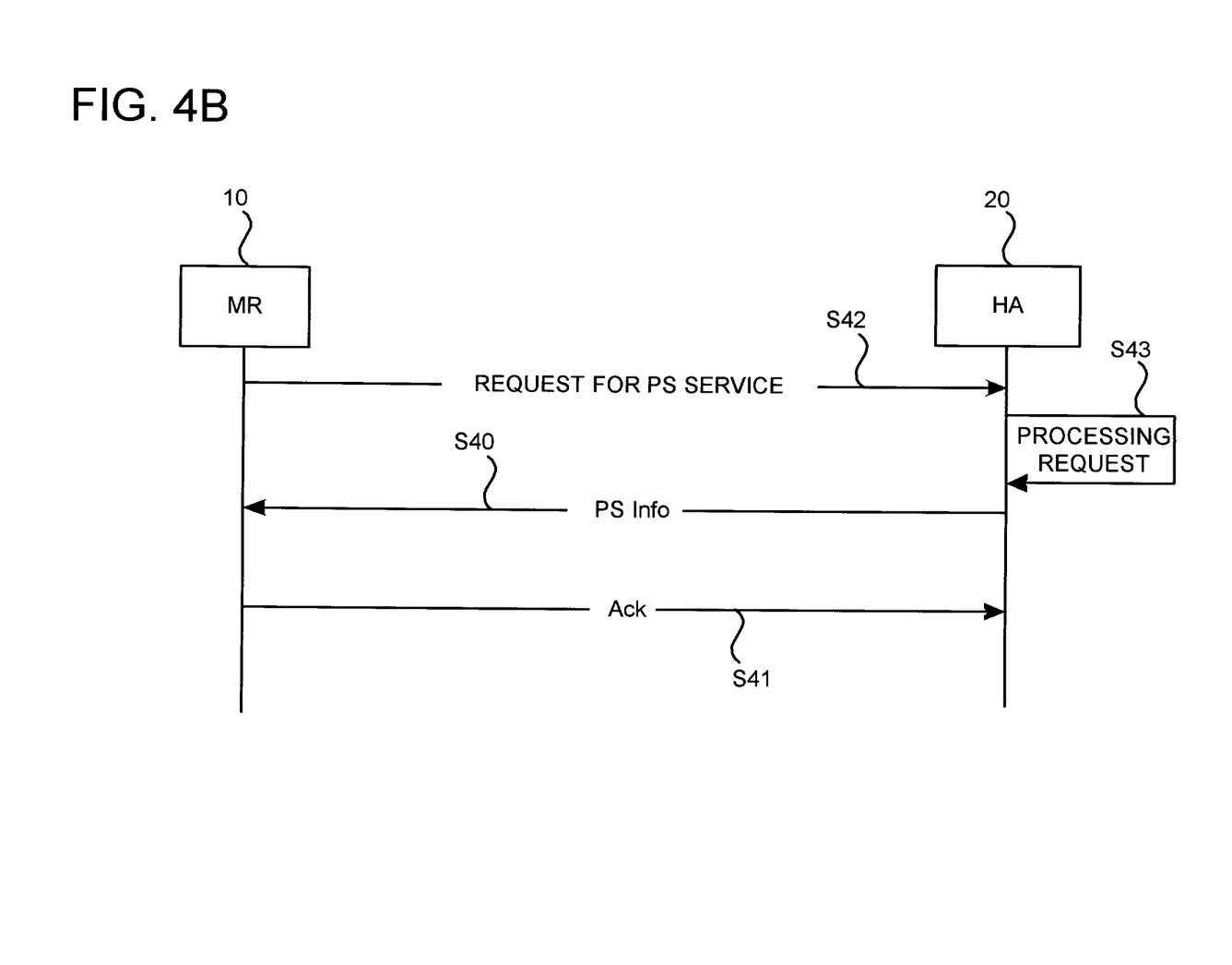
FIG. 4B is a sequence chart illustrating another example of how the home agent (HA) informs the mobile router (MR) of information on a policy server within a de-militarized zone (DMZ) according to a preferred embodiment of the invention.

Once the bi-directional tunnel 37a has been established, the HA 20 will forward to the MR 10 information about the policy server 36 within the DMZ 35. Referring to FIG. 4A and FIG. 4B, how the HA 20 informs the mobile router of information on the policy server 36 within the DMZ 35 will be described. The processes relating to FIG. 4A and FIG. 4B are that the MR 10 acquires information to establish the bi-directional tunnel 37c (information on the policy server 36) with the policy server 36. These steps are optional and need not be executed when either the MR 10 contains information on the policy server 36 beforehand or when establishing the bi-directional tunnel 37c is not necessary.

FIG. 4A shows a sequence chart illustrating one example of how the HA 20 informs the mobile router of information on the policy server 36 within the DMZ 35 according to the preferred embodiment of the invention.

In FIG. 4A, when the MR 10 registers the current CoA with the HA 20, the HA 20 will forward information on the policy server 36 within the DMZ 35 (described as PS Info in FIG. 4A) to the MR 10 (step S40). Information on the policy server 36 is the address of the policy server 36 or a security association key, but is not restricted those information. The address may be but not restricted to an IP address.

The MR 10 stores the address of the policy server 36 in the data storage 14 and replies the HA 20 with an acknowledgement (described as Ack in FIG. 4A) (step S41). At this time, the MR 10 can use the security association key to form the bi-directional tunnel 37c with the policy server 36.

FIG. 4B shows the sequence chart illustrating another example of on how the HA 20 informs the mobile router of information on the policy server 36 within the DMZ 35 according to the preferred embodiment of the invention.

In FIG. 4B, the HA 20 holds and periodically updates a list of available policy sever(s) 36 within the DMZ 35. The list of the policy server(s) 36 is stored within the data storage 24. This would therefore allow the HA 20 to perform load balancing between a plurality of policy servers when there are a plurality of policy servers 36.

The MR 10 sends a request for information on the policy service 36 (described as PS Info in FIG. 4B) to the HA 20 (step S42). The HA 20 processes the request (step S43) and checks which policy server 36 is available by referring to the list of the policy server(s) 36.

Once the HA 20 decides the policy server 36 that will handle the packets of the MR 10, the HA 20 makes a response to the MR 10. Because subsequent processes are the same as steps 40 and 41 shown in FIG. 4A, their descriptions will be omitted.

A visitor node (VN) 31 is a node that is foreign to the mobile PAN 30. When the VN 31 enters the mobile PAN 30, the VN 31 attempts to be connected to the mobile PAN 30 by communicating with the MR 10.

The VN 31 receives an RA (Router Advertisement) form the MR 10 including the home prefix which can be used by the mobile PAN 30. The MR 10 may assign a home prefix (prefix for the VN 31) different from a home prefix to be assigned to the home user's node to the VN 31. The VN 31 may send an RS (Router Solicitation) request to the MR 10 to obtain the home prefix. After acquiring the home prefix, the VN 31 configures a valid address to operate within the mobile PAN 31.

When the VN 31 first requests for a routing service to be provided by the MR 10, the MR 10 executes a process to authenticate the VN 31. Authentication of the VN 31 may be but not restricted to 802.1x shared key authentication. It is desirable that home users nodes within the mobile PAN 30 should share a pre-shared secret with the MR 10.

When the MR 10 has identified that the VN 31 is a foreign node within the mobile PAN 30, the MR 10 stores information on the VN 31 in the date storage 14. The above-described operation connects the VN 31 to the mobile PAN 30.

The data 34a located in the media server 34 within the home network 33 is data accessible by any node which is located within the mobile PAN 30, and the VN 31 can access the data 34a.

A description will now be given of the operation of the VN 31 to access the data 34a present in the media server 34 according to the preferred embodiment of the invention. The following description is given of a case where the MR 10 establishes the bi-directional tunnel 37a with the HA 20 and establishes the bi-directional tunnel 37c with the policy server 36, and a case where the MR 10 establishes only the bi-directional tunnel 37a with the HA 20.

Figure 5:
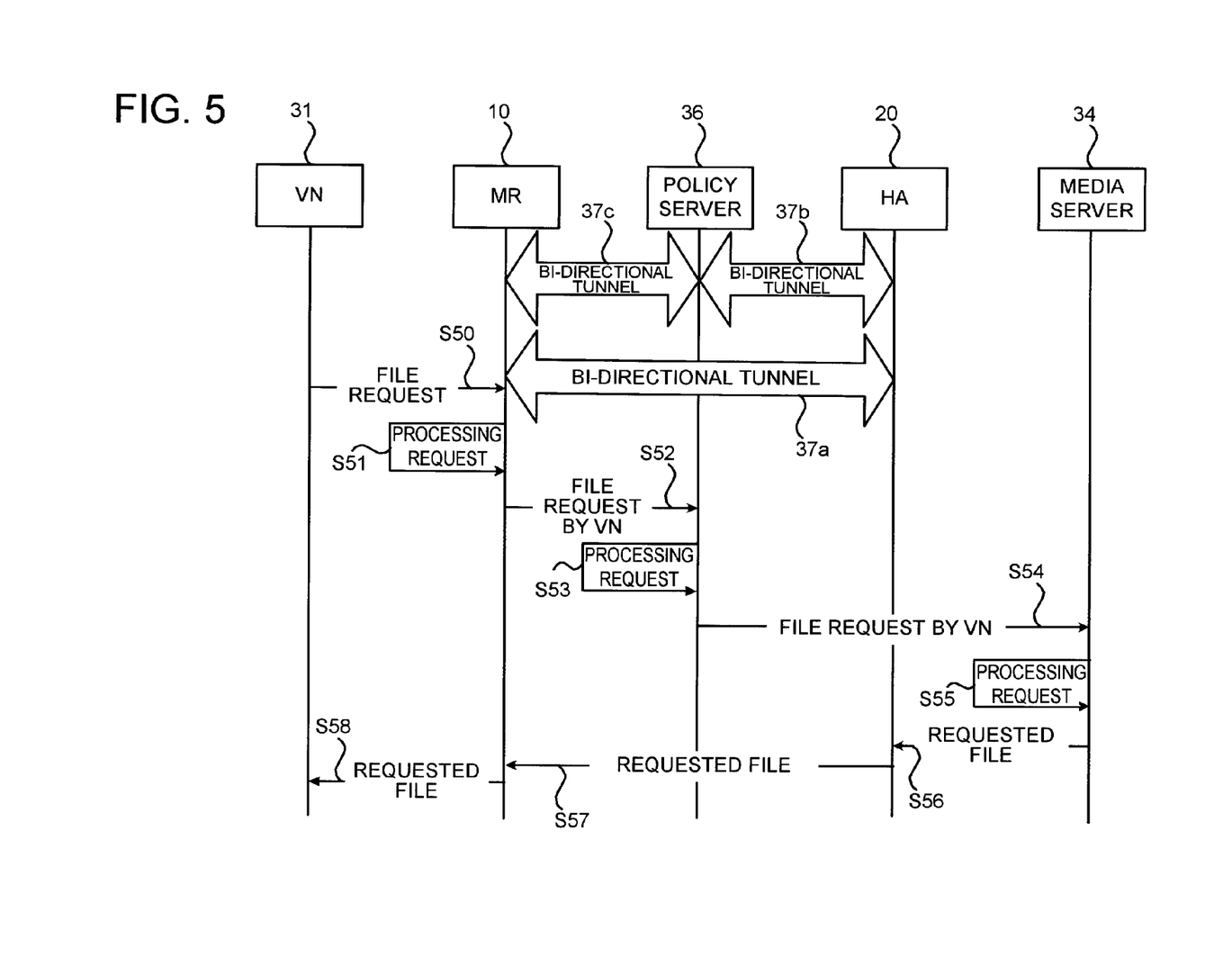
FIG. 5 is a sequence chart illustrating one example of a process of file transfer to a visitor node (VN) according to a preferred embodiment of the invention.

Referring to FIG. 5, a description will be given of the case of using both the bi-directional tunnel 37a established between the MR 10 and the HA 20 and the bi-directional tunnel 37c established between the MR 10 and the policy server 36. While FIG. 5 illustrates the state where the bi-directional tunnel 37b is established between the HA 20 and the policy server 36, the bi-directional tunnel 37b should not necessarily be established between the HA 20 and the policy server 36. FIG. 5 shows a sequence chart illustrating one example of a process of file transfer to the VN 31 according to the preferred embodiment of the invention.

In FIG. 5, the VN 31 attempts to retrieve the data 34a from the medial server 34, and sends a file request to the MR 10 (step S50). The MR 10 processes the request (step S51), and determines if the sender of the file request is the home user node or the VN 31 within the mobile PAN 30. When the sender of the file request is a node which is not authorized to access the data 34a, the MR 10 can refuse the file request at this point of time.

There are various methods available of determining if the sender of the file request is the home user node or the VN 31 in the mobile PAN 30. For example, the MR 10 can specify whether the sender of the file request is the home user node or a foreign node (i.e., the VN 31) by referring to information on the VN 31 stored in the data storage 14 by the MR 10 at the time of authenticating the VN 31.

When the MR 10 is configured to assign a prefix different from that of the home user node to the VN 31, the MR 10 can specify whether the sender of the file request is the home user node or a foreign node (i.e., the VN 31) by referring to the prefix of the address of the sender of the file request. The method of determining whether the sender of the file request is the home user node or the VN 31 in the mobile PAN 30 is not limited to the above-described method.

When the sender of the file request is specified to be the VN 31, for example, the MR 10 encapsulate the file request message and tunnels the file request message to the policy server 36 in the DMZ 35 via the bi-directional tunnel 37*c* (step S52).

At the policy server 36, the packet from the MR 10 is de-capsulated and the file request message is processed in consideration of the security policy 36*a* (step S53). When the file request message meets the condition in the security policy 36*a* (i.e., when access to the data 34*a* by the VN 31 is allowable in consideration of the security policy 36*a*), the policy server 36 forwards the file request message to the media server 34 (step S54). The policy server 36 may encapsulate the file request message before forwarding the file request message to the media server 34. When the file request message does not meet the condition in the security policy 36*a*, for example, the policy server 36 sends the MR 10 a response in the form of a message to refuse the file request.

The policy server 36 can function as the home agent of the VN 31. The policy server 36 can forward the file request message to the media server 34 via the HA 20.

The media server 34 processes the file request message (step S55) to determine if the request is from an authorized entity.

When deciding that the file request is from an authorized entity, the media server 34 forwards the requested file to the HA 20 (step S56), and the HA 20 then tunnels the file to the MR 10 via the bi-directional tunnel 37*a* (step S57). Upon reception of the file, the MR 10 forwards the file to the VN 31 (step S58).

The MR 10 may form a bi-directional tunnel with the media server 34 using the path optimization technique, so that the data 34*a* is securely transferred between the MR 10 and the media server 34.

Although FIG. 5 illustrates the process when the VN 31 has made a file request, the home user node may make a file request. In this case, the MR 10 specifies that the sender of the file request is the home user node, encapsulates the file request message, and sends the file request message to the HA 20 via the bi-directional tunnel 37*a*. When the VN 31 sends a packet destined for a foreign network (i.e., a network other than the home network 33), the packet is supplied to the HA 20 after the policy server 36 checks that the packet is not destined for the home network 33, and the packet is then forwarded to the foreign network.

Figure 6:
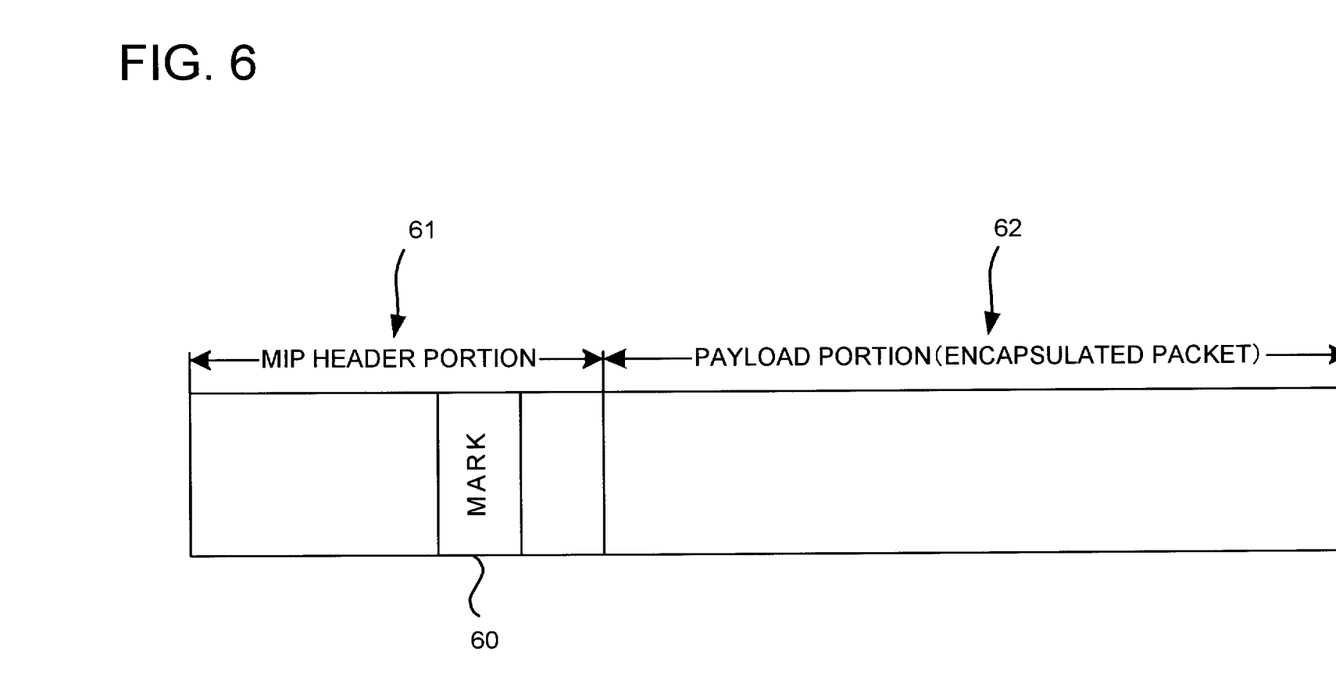
FIG. 6 is a diagram illustrating one example of a packet structure for tagging a packet to distinguish between a packet from a home user's node and a packet from a visitor node (VN) according to a preferred embodiment of the invention.
Figure 7:
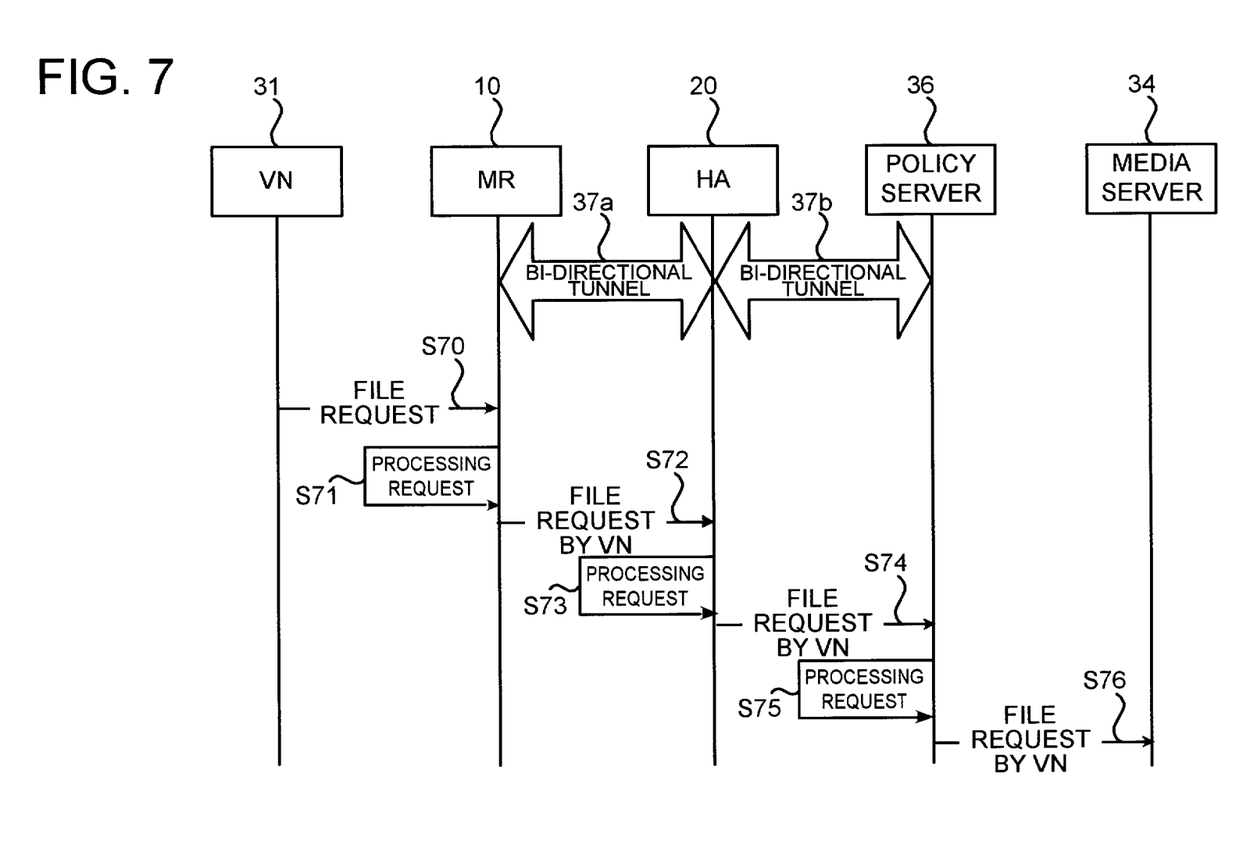
FIG. 7 is a sequence chart illustrating one example of a process of transferring a file request from a visitor node (VN) according to a preferred embodiment of the invention.

Referring now to FIGS. 6 and 7, a description be given of the case of using only the bi-directional tunnel 37*a* established between the MR 10 and the HA 20. In this case, the MR 10 has only to establish the bi-directional tunnel 37*a* with the HA 20. That is, in this case, the MR 10 need not establish the bi-directional tunnel 37*c* with the policy server 36.

In this case, for example, the MR 10 identifies which packet has been sent from the home user node and which packet has been sent from the VN 31, and then forwards the packet to the HA 20. The above-described methods are available as a method of determining whether the packet sender is the home user node or the VN 31. A packet to be forwarded to the HA 20 from the MR 10 is tagged as shown in, for example, FIG. 6.

FIG. 6 shows one example of a packet structure for tagging a packet to distinguish between a packet from a home user node and a packet from a VN according to the preferred embodiment of the invention.

Upon reception of a packet from an arbitrary node in the mobile PAN 30, the MR 10 tags the packet by encapsulating the packet and adding a mark 60 in a header portion 61 of the mobile IP (MIP). A packet received from an arbitrary node in the mobile PAN 30 is encapsulated by a payload portion 62.

The MR 10 determines whether the packet sender is the home user node or the VN 31 before or at the same time as encapsulating the packet, and adds information to identify the home user node or the VN 31 as the mark 60 into the header portion 61 of the mobile IP based on the determination result. The mark 60 may be but not restricted to an address prefix, a token or a flag bit. While the mark 60 is added to the header portion 61 after encapsulation, the mark 60 may be added at any position identifiable by the HA 20 which receives the packet transferred from the MR 10.

FIG. 7 shows a sequence chart illustrating one example of a process of transferring a file request from the VN 31 according to the preferred embodiment of the invention. The sequence chart of FIG. 7, unlike the one shown in FIG. 5, does not use the bi-directional tunnel 37*c* between the MR 10 and the policy server 36. In the operation illustrated in FIG. 7, communication between the HA 20 and the policy server 36 are carried out via the bi-directional tunnel 37*b*; however, a tunnel should not necessarily be used in communication between the HA 20 and the policy server 36.

The MR 10 receives a file request message from the VN 31 to access data 34*a* located within the media server 34 (step S70).

The MR 10 processes the file request message (step S71) to determine whether the sender of the file request message is the home user node or the VN 31 in the mobile PAN 30.

In a case where the sender of the file request message is identified to be the VN 31, for example, the packet is tagged by encapsulating the packet and adding the mark 60 indicating that the packet has come from the VN 31 in the mobile PAN 30. Then, the MR 10 tunnels the tagged file request message to the HA 20 via the bi-directional tunnel 37*a* (step S72). When the sender of the file request message is identified to be the VN 31, the mark 60 indicating that the packet has not come from the home user node is added to the packet.

The HA 20 receives and processes the tagged file request message (step S73) and identifies that the packet has been tagged as a packet from the VN 31. The HA 20 then sends the file request message to the policy server 36 (step S74). As the HA 20 uses the bi-directional tunnel 37*b*, the HA 20 tunnels the file request message to the policy server 36. Though not illustrated in FIG. 7, the HA 20 may forward packets from the home user node to the media server 34 soon.

The policy server 36 receives (then decapsulates) the file request message and executes a process in consideration of the security policies (step S75). When the policy server 36 checks that the file request message is from the authorized VN 31, the policy server 36 forwards the request file message to the media server 34 (step S76). When the file request message does not meet the condition in the security policy 36*a*, for example, the policy server 36 sends the MR 10 a response in the form of a message to refuse the file request.

The policy server 36 can forward the file request message via the HA 20 to the media server 34. Because the processes at the time the requested file is sent to the VN 31 from the media server 34 are the same as the processes of steps S55 to S58 shown in FIG. 5, their descriptions will be omitted.

When the MR 10 is configured to assign a prefix different from that of the home user node to the VN 31, the MR 10 may forward the file request message directly to the HA 20, so that the HA 20 refers to the prefix of the address of the sender of the file request message to identify whether the sender of the file request message is the home user node or a foreign node (i.e., the VN 31).

For example, the MR 10 can prepare an RA message including the prefix for the home user node and an RA message including the prefix for the foreign node. The MR 10 performs some encryption scheme so as to permit only the home user node to decrypt the RA message including the prefix for the home user node, thereby notifying the home user node and the foreign node of different prefixes. The method of notifying the home user node and the foreign node of different prefixes is not limited to the foregoing method.

According to the embodiment of the invention, as described above, when the VN 31 connected to the mobile PAN 30 accesses the home network 33 of the mobile PAN 30, it is possible to always use the security policy 36*a* via the policy server 36 in the DMZ 35.

Although the HA 20 and the policy server 36 are different entities in the embodiment of the invention, the HA 20 and the policy server 36 may be realized by the same entity.

In yet another preferred embodiment, HA 20 can use the mark added to a packet HA 20 receives to perform flow filtering. For example, the user sets a filter policy at HA 20 indicating that packets from the home user node should be given priority over packets from visitor nodes in terms of processing at HA 20. Thus, HA 20 checks the mark 60 located within each packet HA 20 receives and executes the filter rules accordingly. If the mark 60 indicates that the packet is from a home user node, HA 20 places this packet into a packet queue meant for packets for home user node. However, if the mark 60 indicates that the packet is from a visitor node, HA 20 places this packet into a packet queue meant for packets for visitor node. HA 20 would process any packets found in the home user node queue first before processing packets located within the queue for visitor nodes. The advantage of performing such filtering allows the home user to ensure that all nodes belonging to the home user are ensured of fast service.

Because a mobile network provides mobile nodes with transparent connectivity to a home network, those skilled in the art may think that connecting management similar to the security policy set by the policy server should be implemented for a mobile node which is connected to the mobile network and a user should know that authorization of a visitor node to be connected to a mobile network is equivalent to authorization of a visitor node to be connected to the home network. Further, those skilled in the art who take such consideration may think that surely selecting a mobile node connectable to a mobile network does not bring about the situation to which the invention is directed. In such cases, however, it is apparent that the invention can be adapted to a case where it is difficult to provide sufficient connecting management for a mobile network due to problems, such as the processing performance and power consumption of a mobile router or a mobile network node, and a case where a user who is not well acquainted with the security in a mobile network can use the mobile network safely.

Although the invention has been have been illustrated using specific examples, it is obvious for those of ordinary skill in the art that any other arrangement, which can achieve the same object, may be employed. Although the description has been given of the fundamental concept of the invention, specific embodiments used in explaining the fundamental concept of the invention do not restrict the scope of the invention.

The functional blocks used in the foregoing description of the embodiment of the invention are realized typically as LSI (Large Scale Integration) which is an integrated circuit. The functional blocks may each be configured as a single chip, or some or all of the blocks may be configured as a single chip. While LSI is used herein, it may also be called an IC (Integrated Circuit), a system LSI, a super LSI, an ultra LSI, depending on the degree of integration.

The scheme for circuit integration is not limited to LSI, but an exclusive circuit or a general-purpose processor may be used. An FPGA (Field Programmable Gate Array) which is programmable after LSI or a reconfigurable processor designed to be able to reconfigure the connections and settings of circuit cells in the LSI may be used.

Further, if a circuit integration technique which replaces LSI due to advancement of the semiconductor technology or techniques deriving therefrom, circuit integration of the functional blocks can of course be done using such a technique. For example, adaptation of the biotechnology or the like is possible.

INDUSTRIAL APPLICABILITY

The invention has an effect of allowing accurate execution of access control based on various security policies set by a home user with regard to a packet sent from a visitor node (VN), and is adaptable to a communication technique which performs communication using a mobile communication network and an access control technique to improve the security in a personal mobile communication network and a user's home network.

The invention claimed is:

1. A mobile network managing apparatus for controlling and moving with a mobile network, comprising:
   an access request reception unit that receives an access request to a home network of the mobile network managing apparatus from a communication terminal connected to the mobile network;
   a determination unit, comprising a processor, that determines whether the communication terminal having sent the access request received by the access request reception unit is allowed to directly access the home network or not by referring to information stored in an information storage unit;
   a home network communication unit that forwards the access request to a mobile information managing apparatus present in the home network when the communication terminal having sent the access request is allowed to directly access the home network; and
   a security network communication unit that forwards the access request to a security managing apparatus which is located in a security network located between the home network and a foreign network and executes access control the home network, when the communication terminal having sent the access request is not allowed to directly access the home network.

2. The mobile network managing apparatus according to claim 1, further comprising:
   a communication terminal specifying unit that specifies whether the communication terminal is allowed to directly access the home network at a time when the communication terminal is connected to the mobile network.

3. The mobile network managing apparatus according to claim 1, further comprising:
   a prefix notifying unit that notifies prefixes of different addresses respectively to a first communication terminal which is allowed to directly access the home network and a second communication terminal which is not allowed to directly access the home network,
   wherein the determination unit determines whether the communication terminal having sent the access request is allowed to directly access the home network or not by referring to a prefix of an address of the communication terminal having sent the access request.

4. The mobile network managing apparatus according to claim 1, further comprising:

a first tunneling unit that forms a first tunnel with the mobile information managing apparatus, and encapsulates the access request so that the access request is tunneled via the first tunnel when the home network communication unit forwards the access request; and a second tunneling unit that forms a second tunnel with the security managing apparatus, and encapsulates the access request so that the access request is tunneled via the second tunnel when the security network communication unit forwards the access request.

5. A mobile network managing apparatus the controlling and moving with a mobile network, comprising:

an access request reception unit that receives an access request to a home network of the mobile network managing apparatus from a communication terminal connected to the mobile network;

a determination unit, comprising a processor, that determines whether the communication terminal having sent the access request received by the access request reception unit is allowed to directly access the home network or not by referring to information stored in an information storage unit;

an information adding unit that adds, to the access request, index information indicating whether the communication terminal having sent the access request is allowed to directly access the home network or not; and a home network communication unit that forwards the access request having the index information added thereto by the information adding unit to a mobile information managing apparatus present in the home network.

6. The mobile network managing apparatus according to claim 5, further comprising:

a communication terminal specifying unit that specifies whether the communication terminal is allowed to directly access the home network at a time when the communication terminal is connected to the mobile network.

7. The mobile network managing apparatus according to claim 5, further comprising:

a prefix notifying unit that notifies prefixes of different addresses respectively to a first communication terminal which is allowed to directly access the home network and a second communication terminal which is not allowed to directly access the home network, wherein the determination unit determines whether the communication terminal having sent the access request is allowed to directly access the home network or not by referring to a prefix of an address of the communication terminal having sent the access request.

8. The mobile network managing apparatus according to claim 5, further comprising:

a tunneling unit that forms a tunnel with the mobile information managing apparatus, and encapsulates the access request so that the access request is tunneled via the tunnel when the home network communication unit forwards the access request.

9. A mobile information managing apparatus that performs mobile management of a communication terminal attempting to directly access a home network, comprising:

a packet reception unit that receives an encapsulated packet from a mobile network managing apparatus, which is controlling and moving with a mobile network;

a decapsulating unit that decapsulates the encapsulated packet;

a determination unit, comprising a processor, that determines whether the communication terminal having sent the access request is allowed to directly access the home network or not by referring to a prefix of a sender address in an internal packet of the decapsulated packet when the internal packet is an access request for the home network, wherein the prefix information is stored in an information storage unit;

a home network communication unit that forwards the access request to a destination designated by a destination address of the internal packet when the communication terminal having sent the access request is allowed to directly access the home network; and a security network communication unit that forwards the access request to a security managing apparatus which is located in a security network located between the home network and a foreign network and executes access control for the home network, when the communication terminal having sent the access request is not allowed to directly access the home network.

10. The mobile information managing apparatus according to claim 9, further comprising:

a tunneling unit that forms a tunnel with the security managing apparatus, and encapsulates the access request so that the access request is tunneled via the tunnel when the security network communication unit forwards the access request.

11. A mobile information managing apparatus that performs mobile management of a communication terminal attempting to directly access a home network, comprising:

a packet reception unit that receives an encapsulated packet from a mobile network managing apparatus, which is controlling and moving with a mobile network;

a decapsulating unit that decapsulates the encapsulated packet and acquires index information added to an encapsulated header which indicates whether the communication terminal having sent an internal packet of the decapsulated packet is allowed to directly access the home network or not;

a determination unit, comprising a processor, that determines whether the communication terminal having sent an access request is allowed to directly access the home network or not by referring to the index information when the internal packet of the decapsulated packet is the access request for the home network, wherein the index information is stored in an information storage unit;

a home network communication unit that forwards the access request to a destination designated by a destination address of the internal packet when the communication terminal having sent the access request is allowed to directly access the home network; and a security network communication unit that forwards the access request to a security managing apparatus which is located in a security network located between the home network and a foreign network and executes access control for the home network, when the communication terminal having sent the access request is not allowed to directly access the home network.

12. The mobile information managing apparatus according to claim 11, further comprising:

a tunneling unit that forms a tunnel with the security managing apparatus, and encapsulates the access request so that the access request is tunneled via the tunnel when the security network communication unit forwards the access request.

* * * * *